Dec. 9, 1941.     B. B. NEWMAN, JR     2,265,245
MOTOR
Filed Nov. 15, 1939     4 Sheets-Sheet 1

INVENTOR.
Benson B. Newman Jr.
BY Osgood H. Dowell
ATTORNEY.

Dec. 9, 1941.    B. B. NEWMAN, JR    2,265,245
MOTOR
Filed Nov. 15, 1939    4 Sheets-Sheet 4

INVENTOR.
Benson B. Newman Jr.,
BY Osgood H. Dowell
ATTORNEY.

Patented Dec. 9, 1941

2,265,245

UNITED STATES PATENT OFFICE 2,265,245

MOTOR

Benson B. Newman, Jr., Chicago, Ill., assignor to Buell Manufacturing Co., Chicago, Ill., a corporation of Illinois Application November 15, 1939, Serial No. 304,574

15 Claims. (Cl. 121—164)

This invention relates generally to fluid pressure motors, and specifically to an air motor of the single acting reciprocatory type. The invention is concerned particularly with the motor valve means and valve operating mechanism.

An object of the invention is to provide an improved motor for a rocker jack, namely a lifting jack carried by and adapted to be reciprocated vertically by a motor. Rocker jacks are used in connection with the greasing of automobiles. For example, a rocker jack mounted under an automobile may be operated by its jack-screw to raise the automobile body from its springs, and may then be reciprocated by the motor for rocking or vibrating the automobile body relative to the springs, to promote effective penetration of grease between the spring leaves and into the shackles and spring joints.

Compressed air, being conveniently available at automobile servicing stations, is preferably utilized as the motive fluid for a rocker jack motor, which therefore may be advantageously of the type above indicated; the motor being upright and its piston, which carries the jack and load sustained thereby, being raised by compressed air and being lowered by the load thereon during release of air pressure from the lower end of the motor cylinder.

It is desirable to operate a rocker jack motor without undue consumption of compressed air, and in such manner as to give a smooth and gentle reciprocatory movement of the motor piston and jack carried thereby, at a moderate or relatively slow rate, avoiding sudden or jerky-motions as the motor piston reverses the directions of its travel. To provide such a motor with valve means and operating mechanism therefor of a character to promote satisfactory, efficient and reliable performance, and to provide a construction and arrangement which will be relatively simple and give manufacturing as well as functional advantages, are among the general objects of the invention.

Various specific objects and advantages of the invention will be brought out in the following description, with reference to an illustrative rocker jack motor shown in the accompanying drawings; and the subjects-matter of the invention will be particularly set forth in the claims appended hereto.

Referring to the drawings, the illustrative motor contains an embodiment of the invention in what is now considered the preferred form; however it is to be understood that the following description, with reference to the specific embodiment selected for illustration, is not to be taken as limiting the invention otherwise than as defined by the claims appended to the description.

In said drawings:

Fig. 1 is a vertical sectional view of the illustrative motor, showing parts in elevation. This view is schematic, representing a section taken on different vertical planes, namely the planes represented by the staggered line 1—1 of Fig. 2. Fig. 1 shows the motor valves and passages controlled thereby, and shows the valve lever in side elevation. A piston operated mechanism including a snap-action device for operating the valve lever, appears in end elevation.

Fig. 2 is a horizontal section of the illustrative motor taken on the line 2—2 of Fig. 1, and showing a top plan elevation of the valve operating mechanism.

Figs. 3 to 7 inclusive are views taken at right angles to the plane of the valve lever shown in Fig. 1. Said Figs. 3 to 7 show in side elevation the portion of the valve operating mechanism which appears in end elevation in Fig. 1.

Conventional parts of the illustrative motor are the cylinder 10, upper and lower cylinder heads 11 and 12, piston 13, and upwardly extending piston rod 14 guided in the guide sleeve 15. An extensible lifting jack (not shown) may be assumed to be mounted on and carried by the piston rod; which jack, after manual operation of its jack-screw to cause the jack to bear under and lift up an automobile body or other object, may be reciprocated by operation of the motor. Compressed air for operating the motor may be supplied from a source of supply through an air-hose connected with the motor through suitable connections including a cut-off valve (not shown) adapted to be opened by hand when it is desired to operate the motor. The motor piston with the load carried thereby is raised by air pressure thereunder, and lowered by gravity as such pressure is released. The motor may exhaust through the cylinder space above the piston, which communicates with the atmosphere through the hollow piston rod and jack standard. Communication between said cylinder space and interior of the hollow piston rod is provided by the vertical slot 17 in said piston rod. A pin 16 affixed to the guide sleeve 15 engages in the slot 17, thereby preventing rotation of the piston relative to the cylinder, and so preventing derangement of the connections between the piston and valve operating mechanism.

In the operation of the motor, the cylinder space below the piston is maintained in communication with the source of compressed air during the up stroke of the piston. As the piston completes its up stroke, or just before it completes its up stroke, the cylinder space below the piston is instantly cut off from communication with the source of pressure and connected to the exhaust to permit release of pressure. The exhaust is restricted, so that as the loaded piston descends the air trapped below the piston is only slowly and gradually released, preventing sudden dropping of the loaded piston. The release condition is maintained until the piston reaches a certain point near the end of its down stroke, whereupon the exhaust is instantly cut off and the space below the cylinder is simultaneously connected again with the source of compressed air, thus insuring an air cushion under the loaded piston as it reaches the lower limit of its travel and providing the necessary pressure for raising the piston. The valve means and valve operating mechanism employed in the illustrative motor for the performance of the functions above indicated will now be described.

The compressed air or motive fluid is admitted and exhausted to and from the lower end of the cylinder through a duct 18 in the cylinder body. Valve means controlling the admission and exhaust are provided by a pair of balls 20 and 21 arranged one above the other and adapted to be seated in alternation for closing the upper and lower ends of a vertical passage 22 in the upper cylinder head. Said passage 22 communicates by the lateral port 23 with the cylinder duct 18. Slidable in said passage 22 is a rod 25 engageable with said balls, the rod being somewhat longer than the length of said passage, so that the seating of either of the balls will cause the unseating of the other. The upper end of the passage 22, controlled by the ball 20, will be referred to as the admission port, and the lower end of said passage, controlled by the ball 21, will be referred to as the exhaust port. The valve ball 20, contained in a chamber 26 in communication with the source of pressure fluid, seats in the direction of flow of pressure fluid, its seating being assisted by gravity. A spring 27 is preferably provided to assist the seating of said ball 20. When the ball 20 is seated, it is held firmly seated by the air pressure thereon, preventing any air from entering the passage 22. The lower valve ball 21 seats in opposition to the flow of pressure fluid. It is forcibly operated to cause its seating, with the effect of unseating the upper ball 20. Said lower valve ball 21 is guided for vertical movement by any suitable means, as for example by the walls of a recess 28 in which said ball 21 is contained, said recess being in the boss 29 of the upper cylinder head and being in communication with the cylinder space above the piston. In the specific construction shown, the passage 22 containing the slidable rod 25 is formed in an extension 31 of a brass valve body 30 which is in the form of a screw plug and screwed into an interiorly threaded hole in the upper cylinder head. The compressed air chamber 26 in this valve body is closed at its upper end by the screw plug 32. Compressed air flows from the source of supply through the manually operated cut-off valve (not shown) and into the chamber 26 through the pipe section 33, screw plug 32 and filter 34 extending therefrom. It will be observed that the motor valve construction is exceedingly simple and easily installed. Also it permits utilization of the single passage 18 for the flow of motive fluid to and from the lower end of the cylinder.

Figures 1, 2:
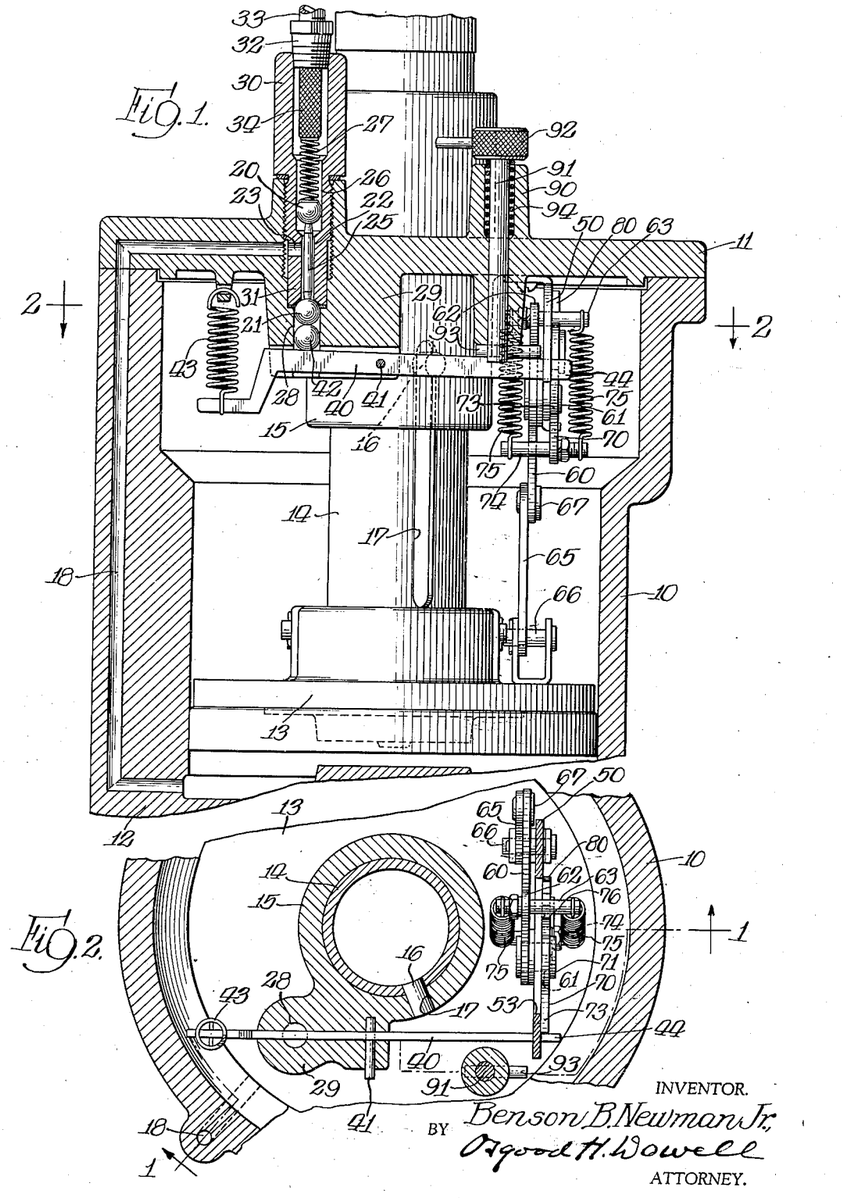

By means presently to be described, the valve balls are forced to the position shown in Fig. 1 as the piston in its down stroke reaches a certain point, before completion of the down stroke. In said position shown in Fig. 1, the exhaust port is closed by the seating of the lower valve ball 21, and the admission port is opened by the unseating of the upper valve ball 20. Compressed air flowing from the source of supply through the cut-off valve (not shown) into the chamber 26, flows around the ball 20 and through the opening in its seat to the port 23 and thence through the duct 18 to the lower end of the cylinder. Thus as the piston approaches the lower limit of its stroke, the release of pressure thereunder is suddenly checked, and motive fluid is admitted thereunder, so that the pressure quickly builds up, providing an air cushion under the piston as it completes its down stroke and supplying the pressure necessary for raising the loaded piston, which rises as the volume of fluid thereunder increases at the pressure necessary to overbalance the weight of the piston and load carried thereby. The valve balls are maintained in the position shown in Fig. 1 during the up stroke of the piston. As the piston completes or is about to complete its up stroke, the lower valve ball 21 is allowed to drop from its seat by gravity, opening the exhaust port, while the upper valve ball 20 becomes immediately seated by the fluid pressure, closing the admission port. The loaded piston then descends by gravity, expelling the trapped motive fluid through the duct 18 and exhaust port into the cylinder space above the piston, from which the expelled fluid passes through the slot 17 into the hollow piston rod and thence to the atmosphere. Due to the restriction of the passage 22 by the rod 25, the exhaust is so restricted that the piston descends at a moderate rate, and a pressure is always maintained in the motive fluid trapped in the motor, which pressure can be quickly built up to a sufficient degree to lift the loaded piston upon closing the exhaust port and opening the admission port. The admission of motive fluid is also restricted but preferably to a less extent than the exhaust, due to the location of the port 23 nearer the upper end than the lower end of the passage 22. The rates of admission and exhaust are dependent upon the effective cross sectional area of the admission and exhaust ports, and the location of the port 23, and may easily be controlled by restricting the passage 22 by the rod 25, which may be of a diameter to provide the degree of restriction desired. By a valve construction such as shown, the motor can be operated at a rate appropriate for the purposes of a rocker jack, using comparatively low consumption of compressed air, and giving a gentle up and down movement of the loaded piston. Ordinarily, for the purposes of a rocker jack, it is desirable to reciprocate the piston at a rate of say from ten to twenty reciprocations per minute. Assuming that with an air pressure of ninety pounds per square inch the piston would reciprocate fifteen times per minute, the pressure can be throttled by the cut-off valve (not shown) so as to reduce the rate of reciprocation to ten times per minute; it being understood that this statement is merely exemplary.

As shown in Fig. 1, a lever 40, pivoted at 41, is arranged to be operated for forcing the valve ball 21 against its seat in opposition to the fluid pressure upon the ball 20. One arm of the valve lever is arranged under and is adapted to lift the ball 21. Said lever arm could operate directly on said ball, but preferably operates through an interposed ball 42, whereby uniform wear of the ball 21 is assured. Thus the upward motion of the said lever arm is transmitted through the ball 42 to the valve ball 21 which communicates motion through the rod 25 to the upper valve ball 20. In the specific construction shown, the valve lever is actuated by a spring 43 to force the valve balls to the position shown in Fig. 1. Said spring 43 is shown as a coiled retractual spring connected to the upper cylinder head and to the lever arm which extends under and lifts the balls. To allow the balls to shift to the position for closing the admission port and opening the exhaust port, the valve lever 40 is actuated against the resistance of the spring 43 by the piston-operated mechanism shown in end elevation in Fig. 1 and in side elevation in Figs. 3 to 6. Said mechanism includes a snap-action means comprising a spring actuated hammer or striker 70 coactable with the opposite arm of the valve lever from that which is engaged by the spring 43. The end portion of said lever arm engagable by the hammer is indicated in the drawings by the numeral 44.

In connection with the operation of valve means, attention is invited to the fact that one of the many advantages of the valve means shown is that it permits operation in the manner described with the use of relatively light springs. When the upper valve ball 20 is seated, the effective area on which the fluid pressure acts is only a small fraction of a square inch. Hence, assuming for example a pressure of ninety pounds per square inch in the chamber 26, the force required to unseat the ball 20 is only a small fraction of the force represented by the fluid pressure on a square inch of pressure area. The spring 43 for actuating the balls against the fluid pressure may therefore be a comparatively light spring. Furthermore, as the lever arm engaged by the spring is, in the illustrative structure, about twice as long as the distance from the fulcrum 41 to the vertical line of the balls, the spring 43 need be only one-half as powerful as if it were in direct line with the balls. As the spring 43 may be of moderate strength, so also the force required to operate the valve lever 40 against the resistance of said spring 43 is moderate, and the spring means for actuating the hammer striker or hammer 70 to operate the valve lever may therefore be relatively light. Incidentally, the force of the spring 43 is opposed by the fluid pressure on the rod 25 transmitted through the balls 20 and 42 to the lever 40, so that the force to be overcome by the hammer in operating the valve lever against the resistance of the spring 43 is less than the full force of said spring 43.

Reference will now be made to the piston-operated mechanism for operating the valve lever, which mechanism is shown in end elevation in Fig. 1, in plan view in Fig. 2, and in side elevation in Figs. 3 to 7. A simple metal stamping, consisting of the plate 50, attached to and depending from the upper cylinder head, provides a supporting frame for said mechanism. The end part 44 of the valve lever 49 is movable up and down beside the downwardly projecting arm 51 of said frame plate, which is cut away at 52 to allow upward movement of said lever part 44 and to provide a stop for limiting the upward movement thereof. An arcuate slot in the frame plate is indicated at 53. The mechanism carried by the frame plate comprises the work lever 60, the hammer or striker 70, and the latch 80. All of these may be simple flat pieces cut or stamped from sheet or plate metal. The work lever and hammer are shown arranged at opposite sides of the frame plate 50, and operate in parallel planes. The work lever 60, pivoted to the frame plate on the pin 61, is shown as a bell crank lever having the upwardly extending arm 62 which carries the cross pin 63 traveling in the arcuate slot 53. Said work lever 60 is operatively connected with the piston by the link 65, pivoted to the piston at 66 and pivoted to the work lever at 67. As the piston moves up and down, the work lever is operated accordingly, swinging the arm 62 and cross pin 63 in opposite directions. As the piston moves upward, the lever arm 62 and cross pin 63 are swung to the left as viewed in Figs. 3 to 6, and as the piston moves downward said lever arm and cross pin are swung toward the right.

Figure 3:
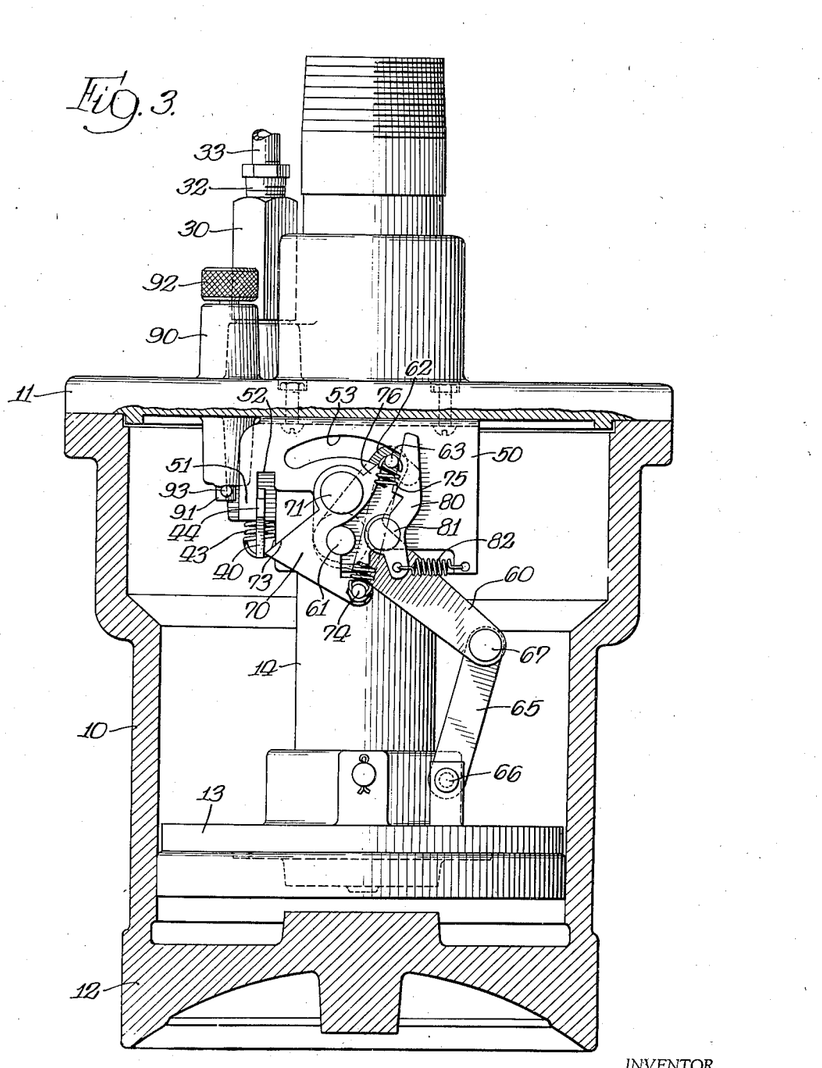
Fig. 3 is a vertical sectional view of the motor, showing in side elevation the piston and valve operated mechanism operated thereby, which mechanism includes a snap-action device or so-called striker for operating the valve lever shown in Fig. 1. As represented in Fig. 3, the motor piston is near the lower end of its travel, and the valve operating mechanism has just assumed the position for causing or allowing operation of the motor valves to admit motive fluid to the lower end of the cylinder and to close the exhaust.
Figure 6:
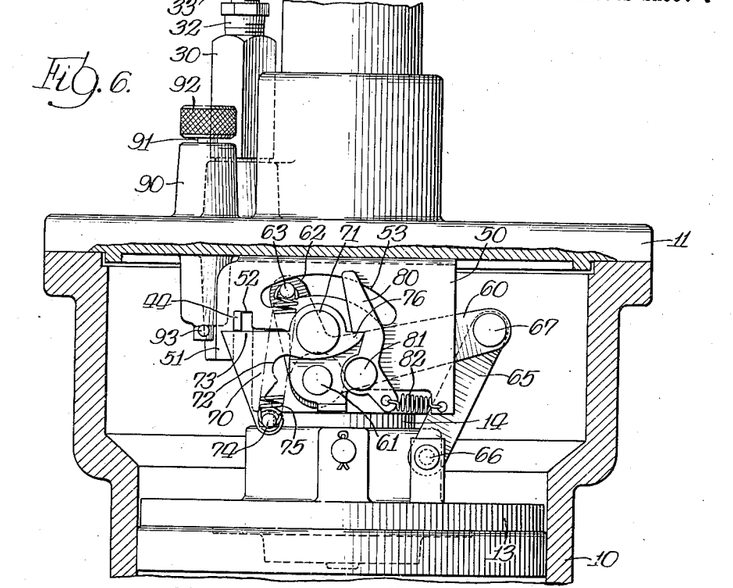
Fig. 6 is a sectional view of the upper part of the motor, showing the piston approaching or near the upper limit of its travel and the valve operating mechanism in the position assumed as it operates the motor valves to cut off admission and to open the exhaust.

The hammer or striker 70 is pivoted to the frame plate on the pin 71 arranged between the pivot pin 61 and the arcuate slot 63. The hammer is adapted to be spring actuated to strike against the under side of the end part 44 of the valve lever and force it instantly upward against the limit stop at 52, thereby operating the valve lever against the resistance of its actuating spring 43 to a position such that the lower ball valve 21 is allowed to drop from its seat a sufficient distance for the upper ball 20 to be held firmly to its seat by the fluid pressure thereon. The position assumed by the hammer in actuating the valve lever is shown in Fig. 6. From that position, the hammer is adapted to be spring actuated to the position shown in Fig. 3 to release the valve lever for actuation by its spring 43 to operate the motor valves to the position shown in Fig. 1, closing the exhaust port and opening the admission port. The hammer is cut away as indicated at 72 to accommodate the pivot pin 61 of the work lever. The swinging movement of the hammer in one direction is limited by said pivot pin 61, as shown in Fig. 3, and movement of the hammer in the opposite direction is limited by the part 44 of the valve lever when abutting the upper limit stop at 52 as shown in Fig. 6. The length of the arcuate slot 53 is such as to allow a greater range of angular movement of the work lever 70 than the angular movement of the hammer. The part of the hammer which strikes the valve lever is indicated at 73. The swinging portion of the hammer carries the cross pin 74 connected by tension spring means with the cross pin 63 carried by the work lever. Said spring means may be provided by a pair of tensioned coil springs 75, arranged at opposite sides of the frame plate and elements pivoted thereto.

The pivoted hammer 70 and the retractile springs 75 connected thereto and to the arm 62 of the work lever in the manner above described, constitute a highly efficient snap action means, the springs of which are stressed as the piston moves up and down and cause a quick snap action of the hammer in movement from one extreme position to the other as the piston reaches certain points in its up and down strokes respectively. Extreme positions of the hammer, and corresponding positions of the work lever are shown in Figs. 3 and 6. Swinging of the lever arm 62 and cross pin 63 to the left from the position shown in Fig. 3, or to the right from the position shown in Fig. 6, will stress or increase the tension of the springs, as is apparent from the drawings. So long as the springs 75 are disposed at one side or the other of the center of the hammer pivot 71, the springs will act to retain the hammer in fixed position. Referring to Fig. 3, it will be apparent that as the piston ascends, the cross pin 63 will be swung to the left past a position in alinement with the center of the pivot 71 and cross pin 74, whereupon the force of the springs will tend to actuate the hammer to the position shown in Fig. 6 to operate the valve means to close the admission port and open the exhaust port. Conversely, as the piston descends, the cross pin 63 will be swung from the position shown in Fig. 6 to the right, past a dead center position with respect to the centers of the pivot pin 71 and cross pin 74, whereupon the force of the springs will tend to actuate the hammer to the position shown in Fig. 3 to release the valve lever 40 for actuation of the valve means to open the admission port and close the exhaust port.

To control the periods of actuation of the hammer, and particularly to obtain actuation of the hammer to the Fig. 3 position at a definite point in the down stroke of the piston, a control means is provided by the latch 80 coactable with a catch constituted by a short tail projection 76 of the hammer 70. The latch 80 is pivoted to the frame plate 50 on the pivot pin 81, and is actuated by the spring 82 in a direction for engagement of the latch with said catch 76.

Figure 4:
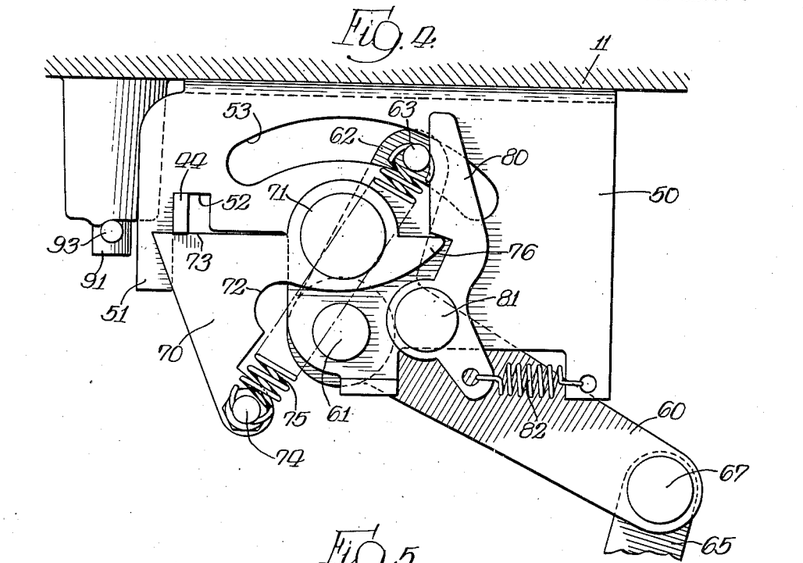
Fig. 4 is a detail view of a portion of the valve operating mechanism in a position through which it passes during the down stroke of the motor piston, such position being assumed shortly before the piston reaches the point at which said mechanism assumes the position shown in Fig. 3.
Figure 5:
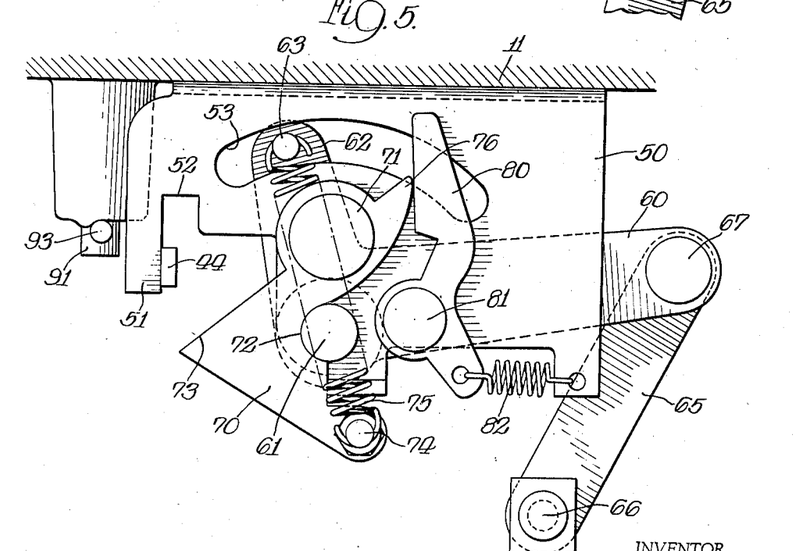
Fig. 5 is a detail view showing said valve operative mechanism in a position through which it passes during the up stroke of the piston and before said mechanism assumes the position shown in Fig. 6.

The operation of the valve operating mechanism embodying the latch mechanism just described will be readily apparent from Figs. 3 to 6 of the drawings. In the down-stroke of the piston, the valve means being in the position shown in Fig. 1, the operating mechanism passes a position in which the cross pin 63 is alined with the center of the pivot pin 71 and cross pin 74, and in the continuing movement passes through a position such for example as shown in Fig. 4. Here the springs 75 are arranged to the right of the pivotal center of the hammer, and exert their force in a manner to actuate the hammer to the position shown in Fig. 3; but nevertheless the hammer is held or locked in the position shown in Figs. 4 and 6 by engagement of the latch 80 over the catch 76. The arm 62 of the work lever is moving the cross pin 63 against the latch, gradually moving the latch against the resistance of its spring 82 to position to disengage and release the catch 76. Not until the latch 80 is displaced from engagement with the catch 76, can the hammer be actuated. The instant the latch releases the catch, the springs 75 will actuate the hammer with a quick snap action to the position shown in Fig. 3, thereby releasing the valve lever 40 for actuation by its spring 43 to force the valve means to the position shown in Fig. 1, opening the admission port and closing the exhaust port. Thus the hammer is not influenced by any pressure which may be exerted thereon by the valve lever 40, and can not be actuated prematurely. The instant of release can be controlled to occur at any desired point in the down stroke of the piston, by proper proportioning of the coactable parts of the latch and the catch 80. Preferably the mechanism is designed so that the latch will be disengaged from the hammer catch at a point when the piston is near the bottom of the cylinder, as shown in Fig. 3. The hammer being actuated to the position shown in Fig. 3, the release of motive fluid from under the piston is instantly checked and the pressure thereunder instantly builds up by flow of compressed air to the lower end of the cylinder, thus providing an adequate air cushion as the piston completes its down stroke and supplying the pressure required for raising the loaded piston. As the piston moves upward the lever arm 62 swings the cross pin 63 to the left past a dead center position with reference to the hammer pivot 71 and cross pin 74, but as the dead center position is passed the springs 75 do not actuate the hammer immediately, since a frictional resistance to such actuation is imposed by engagement of the catch 76 with the spring actuated latch as shown in Fig. 5. As the mechanism passes through a position such for example as shown in Fig. 5, the springs 75 become located a sufficient distance to the left of the pivotal center of the hammer to overcome such frictional resistance and actuate the hammer with a quick snap action to the position shown in Fig. 6, thereby actuating the valve lever 40 against the resistance of its actuating spring 43 to allow operation of the valve balls to close the admission port and open the exhaust port; whereupon the loaded piston will descend by gravity, expelling the air trapped thereunder through the duct 18 and restricted exhaust passage, as previously explained.

In addition to obtaining the advantageous manner of operation above indicated, shifting of the valve means to close the exhaust port and open the admission port at a definite point in the down stroke of the piston, and ready predeterminability of the point at which such operation occurs by proportioning the coactive parts of the hammer catch and latch, there have been further objects in contemplation in connection with the valve operating mechanism described, namely to provide a relatively simple and compact mechanism, susceptible of economical manufacture, and one of approximately balanced character and employing relatively light spring means. By employing the two springs 75 for actuating the hammer, the double advantage is obtained that the individual springs may be relatively light, and the spring force is exerted at opposite sides of the pivoted or swinging elements, so that the tendency of the spring means at one side to cant the swinging elements or to exert side pull on the bearings thereof is counteracted by the spring means at the other side. Hence the swinging elements, namely the work lever and the hammer, may be simple flat pieces, and no extended trunnions or journals are required to keep these elemnts in their intended planes of operation. Another factor of advantage is the pivoting of the work lever and hammer on different centers, with the hammer pivot between the work lever pivot and the arcuate slot 53. By this arrangement, a forcible quick action of the hammer may be exerted with such relatively light springs. With this arrangement, as the springs pass from rest position at one side of the hammer center to the other side, the distance between the points 63 and 74 when the springs are directly in line with the centers is kept at a minimum, and the travel or motion necessary to cause the springs to actuate the hammer is not unduly great.

Figure 7:
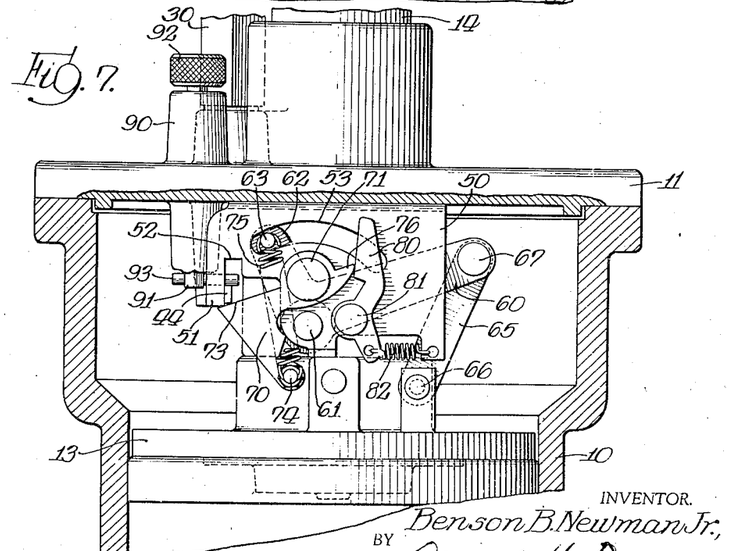
Fig. 7 is a sectional view of the upper part of the motor, showing the piston near the upper limit of its travel and showing parts of the valve operating mechanism locked against movement in a direction to assume the position shown in Fig. 6. The purpose of the locking arrangement shown in Fig. 7 is to prevent further operation of the motor after the piston is raised, so that the piston and jack, with the load carried thereby, can be sustained in elevated position.

In order that the rocker jack may be used when desired as a fluid pressure lifting jack, or for lifting the load and sustaining it in elevated position, the illustrative motor is provided with means for locking the valve lever 40 in the position shown in Fig. 1, so as to render the mechanism shown in Figs. 3 to 7 ineffectual to operate the valve lever to position to close the admission port and open the exhaust port. The upper cylinder head is shown provided with a boss 90 in which is a rotatably mounted vertical rod or shaft 91 operable by the knob 92 and having the lateral arm 93 within the cylinder. Normally the arm 93 is arranged parallel with the valve lever, but in a position such that by turning the rod 91 ninety degrees the arm 93 will engage over the top of the valve lever when in the position shown in Fig. 1. A spring 94 is arranged to impose frictional resistance to rotation of the rod 91, so that it will tend to remain in its normal position. Fig. 7 shows the arm 93 brought to adjusted position to engage over the valve lever 40.

Assuming that the rocker jack is to be used as a fluid pressure lifting jack, as, for example, for the purposes of elevating either the front or rear end or one of the axles of an automobile to permit replacement of a tire, the rod 91 is operated to adjust the arm 93 to the position shown in Fig. 7, this adjustment being made before admitting compressed air to the motor and while the piston is in its lowermost position. The jack carried by the motor piston rod is adjusted by operation of its jack-screw to engage under and bear up against the load to be lifted. Compressed air is then admitted to the motor, causing the piston to rise and lift the load. After the piston-operated mechanism passes through the position shown in Fig. 5, the hammer will be actuated against the end part 44 of the valve lever, but, as the valve lever is held locked by the arm 93, the hammer cannot be swung to the full position shown in Fig. 6, and will be stopped by the part 44 when it has snapped to the position shown in Fig. 7. The compressed air under the piston will continue to push it up until the center boss on the piston encounters the lower end of the guide sleeve 15, and the piston and load carried thereby will then be sustained in elevated position, the cylinder space under the piston being maintained constantly in communication with the source of compressed air. When it is desired to lower the load, or to cause the piston to reciprocate for rocking the load, the rod 91 is turned to disengage the arm 93 from the valve lever, whereupon the tensioned springs 75 will actuate the hammer to the position shown in Fig. 6, thereby actuating the valve lever to allow the opening of the exhaust port and closing of the admission port.

Obviously the illustrative motor may be variously modified in details of construction and arrangement to suit various different requirements and conditions; moreover it is not indispensable that all of the features of the invention be used conjointly, since different features of the invention may be advantageously used in various different combinations and subcombinations.

I claim as my invention:

1. In a reciprocatory single acting fluid pressure motor, the combination of a pair of valve balls, an intervening part having a straight passage therethrough and seats at the ends thereof for the respective balls, said passage being in communication between its ends with the working end of the motor cylinder to which motive fluid is admitted through one end of said passage and from which such fluid is released through the other end of said passage, a thrust rod slidable in and restricting said passage and longer than the distance between said seats and the ends of which abut said balls, so that the seating of one ball transmits motion through said rod to unseat the other ball, the ball at the admission end of said passage being exposed to pressure of motive fluid and adapted to seat in the direction of flow thereof and to be held seated by such pressure, spring-actuated means for forcibly seating the ball at the release end of said passage in opposition to the fluid pressure on the other ball, and means operated by the motor piston for periodically operating said spring-actuated means against its spring resistance to and holding it in a displaced position and then releasing it for its spring-actuation, said balls being operated and held in their alternate positions alternately by the fluid pressure and said spring-actuated means as required for the reciprocation of the piston.

2. A motor of the class described having valve mechanism of the character set forth in claim 1 wherein the piston operated means includes a snap action device for the quick operation of said spring actuated means against its spring resistance, to a position to allow the balls to assume position for closing the admission end and opening the release end of said passage, and for quickly releasing said spring actuated means for spring actuation to force the balls to position for closing the release end and opening the admission end of said passage.

3. A motor of the class described having valve mechanism of the character set forth in claim 1 wherein the piston operated means includes a snap action device for the quick operation of said spring-actuated means against its spring resistance to a position to allow the balls to assume position for closing the admission end and opening the release end of said passage, and for quickly releasing said spring-actuated means for spring-actuation to force the balls to position for closing the release end and opening the admission end of said passage, in combination with timing means controlling said snap-action device to release said spring-actuated means for forcing the balls to position for admission at a definite point in the return stroke of the piston.

4. In a reciprocatory single acting fluid pressure motor, the combination of a pair of valve balls, an intervening part having a straight passage therethrough and seats at the ends thereof for the respective balls, said passage being in communication between its ends with the working end of the motor cylinder to which motive fluid is admitted through one end of said passage and from which such fluid is released through the other end of said passage, a thrust rod slidable in and restricting said passage and longer than the distance between said seats and the ends of which abut said balls, so that the seating of one ball transmits motion through said rod to unseat the other ball, the ball at the admission end of said passage being exposed to pressure of motive fluid and adapted to seat in the direction of flow thereof and to be held seated by such pressure, a spring actuated lever arranged to operate the ball at the release end of said passage for forcing it to its seat in opposition to the fluid pressure on the other ball and for holding it seated during the working stroke of the motor piston, and piston-controlled means including a snap-action device for periodically quickly operating said lever against the resistance of its actuating spring to and holding it in a displaced position to allow unseating of the ball at the release end of said passage and the seating of the ball at admission end of said passage and then quickly releasing said lever for spring actuation, whereby said balls are operated and held in their alternate positions alternately by the fluid pressure and said spring-actuated means as required for the reciprocation of the piston.

5. A motor of the class described having valve mechanism of the character set forth in claim 4 wherein the balls are arranged one above the other so that their movement to position to close the admission end of said passage and to open the release end is assisted by gravity, the said lever being under the ball which closes the release end of said passage, and another ball interposed between said last mentioned ball and said lever by which to communicate motion of said lever to said ball which closes the release end of said passage, so as to promote even wear of the latter, said last mentioned ball and interposed ball being guided for vertical movement.

6. In a reciprocatory single acting fluid pressure motor, the combination of motor controlling valve means arranged to operate in the direction of flow of motive fluid to cut off admission thereof to the working end of the motor cylinder and to be held by pressure of such fluid in position for release of such fluid from said working end of the cylinder, spring actuated means for operating said valve means in opposition to the fluid pressure thereon to position for admission and to hold said valve means in said position for admission during the working stroke of the motor piston, and piston controlled mechanism for operating said spring-actuated means against the spring resistance thereof to a displaced position for freeing the valve means from the action of said spring-actuated means and for holding the same in such displaced position during the return stroke of the piston, said piston-controlled mechanism so operating said spring-actuated means as the piston completes its working stroke and releasing said spring-actuated means for actuation by its spring as the piston approaches but before it completes its return stroke.

7. A motor of the class described having valve mechanism of the character set forth in claim 6, provided with means manipulatable to lock and retain said spring-actuated means in the position to which it is actuated by its spring, so as to prevent its displacement to position to allow pressure operation of the valve means to position for cutting off admission and permitting release of motor fluid from the working end of the cylinder, whereby the motor may be used for jacking a load and sustaining it in the position to which it is jacked.

8. In a reciprocatory single acting fluid pressure motor, the combination of motor controlling valve means arranged to operate in the direction of flow of motive fluid to cut off admission thereof to the working end of the motor cylinder and to be held by pressure of such fluid in position for release of such fluid from said working end of the cylinder, spring-actuated means for operating said valve means in opposition to the fluid pressure thereon to position for admission and to hold said valve means in said position for admission during the working stroke of the motor piston, and mechanism operated by the motor piston comprising a snap-action device for quickly operating said spring-actuated means against its spring resistance to position for freeing the valve means from its action and for holding it in such position during the return stroke of the piston and quickly releasing it for spring actuation to force the valve means to position for admission.

9. In a reciprocatory single acting fluid pressure motor, the combination of motor controlling valve means arranged to operate in the direction of flow of motive fluid to cut off admission thereof to the working end of the motor cylinder and to be held by pressure of such fluid in position for release of such fluid from said working end of the cylinder, spring-actuated means for operating said valve means in opposition to the fluid pressure thereon to position for admission and to hold said valve means in said position for admission during the working stroke of the motor piston, and mechanism for quickly operating said spring-actuated means against its spring resistance to position for freeing the valve means from its action and for holding it in such position during the return stroke of the piston and quickly releasing it for spring actuation to force the valve means to position for admission, said mechanism comprising a swinging member for so operating and releasing said spring-actuated means, a lever arm operatively connected to the motor piston to swing in opposite directions as the piston reciprocates, spring means connecting said arm and member and which as the arm moves one way beyond a certain position will force said member to one of its positions and as the arm moves the opposite way beyond a certain position will force said member to the opposite of its positions.

10. In a reciprocatory single acting fluid pressure motor, the combination with motor controlling valve means arranged to operate in the direction of flow of motive fluid to cut off admission thereof and to be held by pressure of such fluid in position for release of such fluid from the working end of the motor cylinder, of a spring-actuated lever for operating said valve means in opposition to such pressure to position for admission and holding the same in the latter position, piston-controlled means for operating said lever against the resistance of its actuating spring to position to allow pressure operation of the valve means to position for release of motive fluid from the working end of the cylinder and for holding said lever in the last mentioned position thereof during the return stroke of the motor piston, and means for locking said lever in the position to which it is actuated by its spring so as to prevent operation of the valve means when the piston completes its working stroke.

11. In a reciprocatory single acting fluid pressure motor, the combination with motor controlling valve means of operating means therefor including a swinging operating member, a lever arm operatively connected with the motor piston and swinging in opposite directions as the piston reciprocates, said arm and member being pivoted side by side for operation in parallel planes and on different centers, spring means comprising a rectractile coiled spring connecting said arm and member, the pivotal centers of said arm and lever being between the arcs of travel of the connections of said spring and the pivotal center of said member being between the pivotal center of said arm and the arc of travel of the connection of said spring with said arm.

12. A construction of the character set forth in claim 11 wherein said swinging member has a tail projection and a spring-actuated latch is provided engaging the same to prevent actuation of said member during the return stroke of the motor piston until a definite point is reached in said return stroke.

13. In a reciprocatory single acting fluid pressure motor, the combination of motor controlling valve means arranged to operate in the direction of flow of motive fluid to cut off admission thereof to the working end of the motor cylinder and to be held by pressure of such fluid in position for release of such fluid from said working end of the cylinder, spring-actuated means for operating said valve means in opposition to the fluid pressure thereon to position for admission and to hold said valve means in said position for admission during the working stroke of the motor piston, and piston controlled mechanism for operating said spring-actuated means against the spring resistance thereof to a displaced position for freeing the valve means from the action of said spring-actuated means and for holding the same in such displaced position during the return stroke of the piston, said piston-controlled mechanism comprising a snap-action device for so operating said spring-actuated means as the piston completes its working stroke and releasing said spring-actuated means for actuation by its spring as the piston approaches but before it completes its return stroke, and means controlling the operation of said mechanism to allow said releasing of said spring-actuated means only when a definite point is reached in the return stroke of the piston.

14. In a reciprocatory single acting fluid pressure motor, the combination of motor controlling valve means arranged to operate in the direction of flow of motive fluid to cut off admission thereof to the working end of the motor cylinder and to be held by pressure of such fluid in position for release of such fluid from said working end of the cylinder, spring-actuated means for operating said valve means in opposition to the fluid pressure thereon to position for admission and to hold said valve means in said position for admission during the working stroke of the motor piston, and piston controlled mechanism for operating said spring-actuated means against the spring resistance thereof to a displaced position for freeing the valve means from the action of said spring actuated means and for holding the same in such displaced position during the return stroke of the piston, said mechanism comprising a pivoted striker, a lever arm operatively connected to the motor piston, spring means connecting said arm and striker and which after the arm moves past a certain position during the working stroke of the motor piston will force said striker to position for so operating said spring-actuated means to and holding it in said displaced position, and which after said arm moves past a certain position during the return stroke of the piston will force said striker to position for releasing said spring-actuated means for actuation by its spring, and a pivoted latch coacting with said striker to allow the last mentioned operation thereof only when a definite point is reached in the return stroke of the motor piston.

15. A construction according to claim 14 whereon said arm and striker are pivoted side by side for operation in parallel planes and on different pivotal centers between the arcs of travel of the connections of said spring means with said arm and striker, the pivotal center of said striker being between the pivotal center of said arm and arc of travel of the connection of said spring means with said arm, and wherein a spring held latch as exemplified by the element 80 in the drawings coacts with a tail projection of said striker as exemplified by the element 76 in the drawings, substantially as and for the purpose set forth.

BENSON B. NEWMAN, JR.